United States Patent [19]

Kyle

[11] Patent Number: 4,461,926
[45] Date of Patent: Jul. 24, 1984

[54] HERMETICALLY SEALED INSULATING ASSEMBLY

[76] Inventor: James C. Kyle, 2547 Fisher Rd., Roseburg, Oreg. 97470

[21] Appl. No.: 322,014

[22] Filed: Nov. 16, 1981

Related U.S. Application Data

[63] Continuation of Ser. No. 111,787, Jan. 9, 1980, abandoned.

[51] Int. Cl.$^3$ ............... H01B 17/26; C03C 27/02; C03C 3/22
[52] U.S. Cl. ............... 174/152 GM; 65/21.1; 65/33; 65/59.34; 65/59.35; 166/65 R; 174/50.61; 501/4; 501/15; 501/32; 501/74
[58] Field of Search ............... 174/50.58, 50.61, 151, 174/152 GM; 65/59.1, 59.3, 59.31, 59.34, 59.35, 59.4, 59.5, 59.6; 128/419 P; 166/65 R; 403/28, 29, 30, 179

[56] References Cited

U.S. PATENT DOCUMENTS

| | | | |
|---|---|---|---|
| 2,138,660 | 11/1938 | Mann | 174/152 GM X |
| 2,147,418 | 2/1939 | Bahls | 174/152 GM X |
| 3,219,753 | 11/1965 | Vassos | 174/152 GM |
| 3,225,132 | 12/1965 | Baas et al. | 174/151 |
| 3,303,268 | 2/1967 | Darnois | 174/50.51 X |
| 3,307,958 | 3/1967 | Earl | 501/22 |
| 3,331,913 | 7/1967 | Johnson | 174/152 GM X |
| 4,140,613 | 2/1979 | Inoue et al. | 174/152 GM X |
| 4,174,145 | 11/1979 | Oeschger et al. | 174/152 GM X |

FOREIGN PATENT DOCUMENTS 749540  12/1966  Canada ............... 174/152 GM

*Primary Examiner*—Laramie E. Askin
*Attorney, Agent, or Firm*—Ellsworth R. Roston; Charles H. Schwartz

[57] ABSTRACT

First and second spaced members are hermetically sealed by a partially amorphous and partially crystalline insulating material. The insulating material is non-hygroscopic and is able to withstand forces of about 26,000 psi at about 700° F. It may provide resistances of at least 10,000 megohms even when subjected to 500 volts AC or DC and to steam at about 212° F. for three (3) days. A second insulating layer may be fused to the first insulating layer with essentially the same properties and composition as the first layer. However, the second layer may be more crystalline than the first layer to provide a mechanical and chemical barrier. The insulating materials may be formed from the oxides of lead, zinc, aluminum, silicon, cerium, lanthanum, cobalt, sodium, zirconium, bismuth and molybdenum. The oxides of lead, silicon, bismuth and sodium may be glass formers. The oxides of cerium, lanthanum and zirconium may form crystals. A mixture of the oxides may be heated to at least 2000° F. for several hours and quenched in water to form first beads. These beads may be disposed between the first and second members. The assembly may then be heated for a limited time at about 1900° F. and then quenched. The second insulating material may be formed into beads as described above. These beads may be disposed to abut the first beads. The insulating materials may then be fused by heating them to the elevated temperature for the limited time as discussed above.

14 Claims, 3 Drawing Figures

HERMETICALLY SEALED INSULATING ASSEMBLY

This is a continuation of application Ser. No. 111,787, filed Jan. 9, 1980, now abandoned.

This invention relates to a hermetically sealed assembly which has properties of withstanding considerable forces and providing high electrical resistances even when subjected to extreme adverse conditions. The invention is particularly adapted to be used in oil wells to produce a hermetic seal for protecting expensive electrical equipment when such electrical equipment is disposed in the well. the invention also relates to the chemical composition of the insulating material which constitutes one of the features of the invention and which is included in the assembly to produce the hermetic seal. The invention further relates to a method of producing such insulating material and of producing the hermetic seal.

In previous years, it has been relatively easy to drill for oil in reserves below the ground and to withdraw such oil to ground level. However, as oil has become depleted, it has become necessary to drill for oil at increasing depths below the ground. Furthermore, it has become increasingly difficult to withdraw such oil from its positions of deposit and to raise such oil to ground level. This has resulted in part because of the increased depth of the oil, the increased viscosity of the oil and the disposition of the oil in the surrounding soil.

In order to withdraw the oil efficiently, it has been necessary to provide instruments of increased sophistication for use with the oil well equipment to determine various parameters which control the operation of the oil well equipment. In order for such instruments to operate satisfactorily, the instruments have had to be shielded so that they are not subjected to excessive mechanical or electrical forces or other parameters of an extreme nature. As a result, the instruments have been disposed in log heads which have been shielded from the oil well equipment so that the instruments can provide reliable and sensitive measurements of different parameters. Such shielding has been provided by insulating materials which have been included in the log head to shield the instruments from the forces and other parameters existing on an adverse basis on one side of the log head.

The adverse conditions to be shielded from the measuring equipments may be seen from the following specifications. The oil well equipments are often subjected to pressures as high as twenty six thousand (26,000) pounds per square inch. The problems relating to such forces are compounded because the temperatures in the oil well may be as high as 700° F. As will be seen, it is quite difficult to provide materials which will withstand forces as high as twenty six thousand (26,000) pounds per square inch at temperatures as high as 700° F. Furthermore, in order to provide a proper shielding of the measuring equipment, the materials providing the shielding should provide electrical resistances as high as ten thousand (10,000) megohms even when subjected to potentials as high as five hundred (500) volts AC or DC. This high electrical resistance should exist even when the shielding materials are subjected to such adverse conditions as steam at 212° F. for extended periods of time such as three (3) days. In other words, the materials should be non-hygroscopic.

Various insulating materials have been provided until now with limited success in achieving the parameters discussed in the previous paragraph. However, the materials have not been successful because they have not been able to withstand the mechanical forces described above or provide the electrical resistances described above, at least at the elevated temperatures and for the extended periods of time described above. When the materials have been unable to provide such parameters, the oil well equipment has had to be withdrawn from the well and new materials have had to be substituted. This has substantially reduced the time of operating such equipment and has also considerably increased the cost of such operation. As a result, the limitations in such shielding materials have materially affected the economics of recovering oil from positions below the ground.

Various attempts have been made throughout a long number of years to provide assemblies which will overcome the above disadvantages. Such attempts have been far from successful. Oil well equipments have been able to be operated only for limited periods of time without substituting new shielding material because the shielding materials have failed after only a limited period of use. The attempts to provide satisfactory shielding materials have been unsuccessful even as the cost of oil has escalated and the importance of oil from economic and political standpoints has increased.

This invention relates to apparatus which has particular utility in oil well equipment but also has utility in a number of other fields where extreme conditions of temperature and mechanical and electrical forces may occur. The invention also relates to a particular insulating material which is included in such apparatus to provide a hermetic seal. This material has partially crystalline and partially amorphous characteristics. The invention further relates to a method of producing such insulating material and also to a method of producing articles which include the insulating material to provide a hermetic seal. The invention further relates to apparatus which includes two fused layers of insulating material, with one layer providing a hermetic seal and the other providing an enhanced barrier against the passage of mechanical and electrical forces.

In one embodiment of the invention, a first member and a second member spaced from each other are hermetically sealed by the insulating material included in this invention. The insulating material may be partially amorphous and partially crystalline. The insulating material may have properties of providing an exceptionally high electrical resistance and may be non-hygroscopic and may be able to withstand very high forces. For example, the material may be able to withstand forces in the order of twenty six thousand (26,000) pounds per square inch even at temperatures in the order of 700° F. The material may provide resistances of at least ten thousand (10,000) megohms even when subjected to potentials as high as 500 volts AC or DC. The material may even provide such resistances even after being subjected to steam at approximately 212° F. in a confined space for a period as long as three (3) days and then being blow dried with dry nitrogen for approximately thirty (30) seconds.

A second layer of insulating material may be fused to the first layer of insulating material. The second layer of insulating material may have properties approaching those of the first layer. However, the second layer of insulating material may be more crystalline than the first layer. This facilitates the operation of the second layer of insulating material in providing a mechanical, chemical and electrical barrier. The second layer of insulating material may actually have substantially the same chemicals as the first layer but in different proportions than the first layer.

The insulating materials may be formed from the oxides of lead (preferably red lead), zinc, aluminum (preferably calcined), silicon, cerium, lanthanum, cobalt, sodium, zirconium, bismuth and molybdenum. The oxides of lead, silicon, bismuth and sodium may be glass formers. The oxides of cerium, lanthanum, zinc and zirconium may form crystals. Such oxides as those of cobalt and molybdenum are especially desirable when the members to be hermetically sealed are made from an alloy such as that designated as "Inconel", which has a composition including such metals as nickel, cobalt, iron, vanadium and chromium.

The insulating material may be formed and may be fused to the first and second members by a novel method. A mixture of the oxides specified above may be provided and heated to a temperature of at least 2000° F. for a relatively extended period such as several hours, a period such as approximately three (3) hours being preferable. The mixture may be then guenched in water and particles of the quenched mixture of different sizes may be formed into beads.

The beads may then be disposed in the space between the first and second spaced members. The assembly may then be heated for a limited period of time, such as a period of approximately twenty (20) minutes to forty (40) minutes, at an elevated temperature in the order of 1900° F. The assembly may subsequently be quenched, preferably in air at ambient room temperatures.

When the second insulating material is fused to the first insulating material, the second insulating material may initially be formed into beads in the manner described above. The beads of the first insulating material may then be disposed in one layer and the beads of the second insulating material may be disposed in a second layer on the first layer. The two layers may then be fused at the elevated temperature of 1900° F. for the limited period of time.

Figure 1:
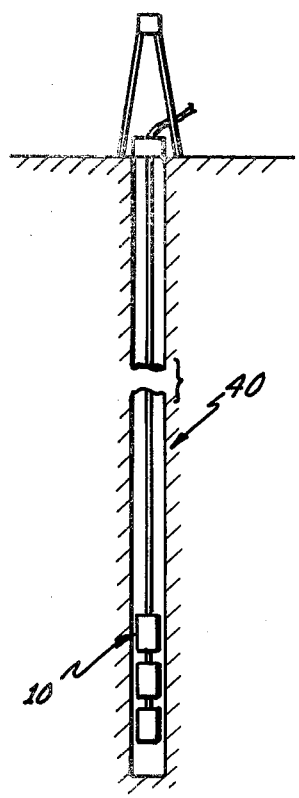
FIG. 1 is a schematic view of an oil well, oil well equipment in the well and instruments for determining parameters in the well and for testing the operation of the oil well equipment.
Figure 2:
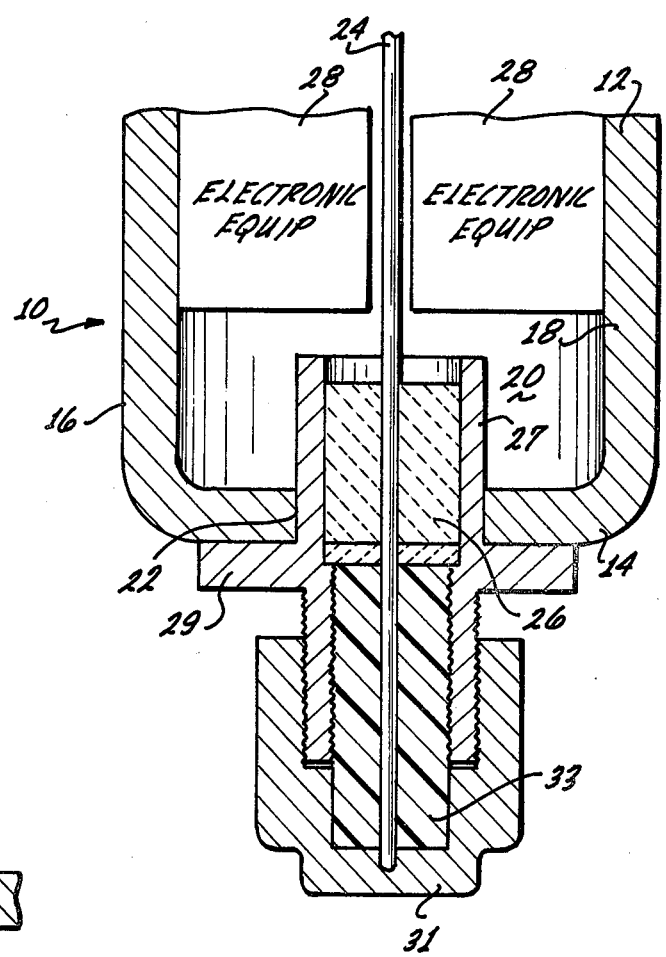
FIG. 2 is a sectional view of apparatus constituting one embodiment of the invention for isolating the testing instruments from the oil well equipment.
Figure 3:
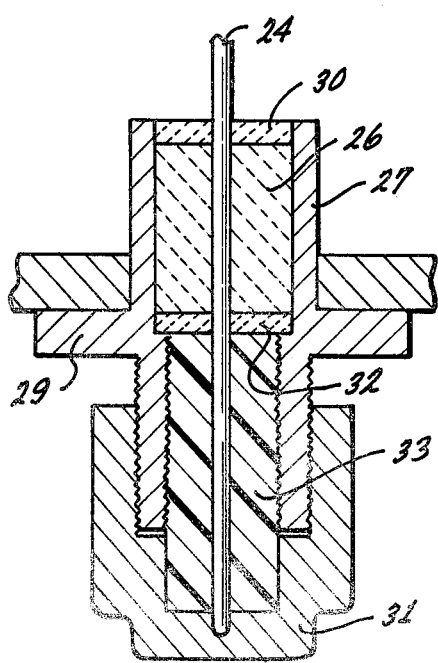
FIG. 3 is a sectional view of apparatus constituting a second embodiment of the invention for isolating the testing instruments from the oil well equipment.

In one embodiment of the invention, apparatus generally indicated at 10 is provided for use in oil wells. The apparatus includes a log head 12 having a generally U-shaped configuration. This U-shaped configuration is defined by a bottom leg 14 and a pair of arms 16 and 18 extending upwardly from the outer ends of the leg 14 to define a sheltered area 20. An aperture 22 is provided in the leg 14 at an intermediate position along the length of the leg. A rod 24 extends through the aperture 22 in spaced relationship to the walls of the leg 14. Insulating material generally indicated at 26 and constituting one of the features of the invention hermetically seals the rod 24 and the log head 12.

The insulating material 26 is hermetically sealed to a ferrule 27 which extends through the aperture 22 and which has a collar 29 disposed against the bottom leg 14 of the log head 12. The bottom of the ferrule 27 is threaded to receive a threaded nut 31. The ferrule 27 and the nut 31 enclose suitable insulating material 33.

The apparatus 10 is constructed to be lowered into an oil well, generally indicated at 40, to the depth at which oil is recovered from the well. The area below the log head 12 experiences conditions of an extreme nature. For example, the rod 24 may be subjected to forces as high as twenty six thousand (26,000) pounds per square inch at positions below the log head 12. Furthermore, such forces may be imposed at temperatures as high as 700° F. The area below the log head 12 may also be subjected to live steam in confined quarters at 212° F. for extended periods of times such as three (3) days or even longer.

Electrical instruments 28 may be disposed in the sheltered area 20 defined by the log head 12. Such equipment may be provided to measure various parameters relating to conditions within the oil well and further relating to the operation of the oil well equipment. Such instruments 28 are disposed within the sheltered area 20 so that the area will be isolated from the extreme conditions imposed upon the oil well equipment at positions below the log head 12. By isolating such instruments 28 from such extreme conditions, the instruments are able to operate in a sensitive and reliable manner. Furthermore, the instruments can be designed to operate under ambient conditions which are relatively normal. Such design of the instruments facilitates the sensitive and reliable operation of the equipment and minimizes their cost.

The insulating material 26 has characteristics for hermetically sealing the rod 24 and the log head 12 in such a manner that the extreme conditions below the log head are isolated from the sheltered area within the log head. For example, the insulating material 26 is able to withstand forces as high as twenty six thousand (26,000) pounds per square inch. Furthermore, the insulating material is able to withstand such forces even at temperatures as high as 700° F. The insulating material also provides electrical resistances as high as ten thousand (10,000) megohms even when subjected to potentials as high as five hundred (500) volts DC or AC. The insulating material 26 is also non-hygroscopic. For example, the insulating material is still able to provide electrical resistances as high as ten thousand (10,000) megohms even after being subjected to live steam at a temperature of 212° F. in a confined space for a period as long as three (3) days and thereafter being blow dried for a period as short as thirty (30) seconds.

The rod 24, the ferrule 27 and the log head 12 are preferably made from the same or similar materials. This material is preferably an alloy of nickel, cobalt, iron, vanadium and chromium designated by the trademark "INCONEL". For example, the material commonly designated in industry as "INCONEL 750" may be used. One source of such material may be Castle Metals of Los Angeles, Calif. When such materials are used, the combination of the rod 24, the log head 12 and the insulating material 26 provide no absorption of moisture and a completely stable system under the adverse conditions discussed in the previous paragraph. This causes the equipment 28 to be completely isolated within the log head 12 from the extreme conditions encountered outside of the log head.

The stable conditions encountered by the combination of the rod 24, the log head 12 and the insulating material 26 are contrary to all known glasses or amorphous compounds which may be similar to glasses. For example, all of these glasses and amorphous compounds are at least slightly soluble in water. Furthermore, none of these glasses has the ability to withstand the forces occurring at times in oil wells, particularly at the elevated temperatures encountered. These glasses and amorphous compounds are accordingly unsatisfactory for use in the extreme conditions described above.

The insulating material 26 may be formed from the following materials in the following relative amounts by weight:

| Material | Relative Amount by Weight |
| --- | --- |
| Lead oxide (preferably red lead) | 355 |
| Zinc oxide | 40 |
| Alumina (preferably calcined) | 20 |
| Silicon dioxide | 300 |
| Cerium oxide | 10 |
| Lanthanum oxide | 30 |
| Cobalt oxide | 15 |
| Sodium antimonate | 80 |
| Zinc zirconium silicate | 30 |
| Bismuth trioxide | 100 |
| Molybdenum trioxide | 30 (but as low as 0.5% by weight) |

Oxides selected from a group consisting of the oxides of chromium, nickel and manganese may be substituted for the oxide of cobalt. Oxides selected from a group consisting of the oxides of lithium and potassium may be substituted for the oxide of sodium. The oxide of lanthanum may be substituted for the oxide of cerium. A material such as zinc zirconium silicate may be substituted for the oxide of zinc. However, all of such substitutions may cause the properties of the resultant insulating material to deteriorate slightly from the properties of the material obtained from the mixture specified above.

The insulating material forming a part of this invention is produced by a novel method. The different materials are initially weighted and milled and dried in a dry ball mill for an extended period of time such as approximately three (3) hours. The materials may then be placed in a mullite crucible preheated to a suitable temperature such as approximately 2200° F. The mixture may be heated in the preheated crucible at a suitable temperature such as a temperature of approximately 2200° F. for an extended period of time such as approximately six (6) hours. The mixture may thereafter be air cooled to a suitable temperature such as approximately 1000° F. The material may subsequently be heated in the mullite crucible to an elevated temperature such as approximately 2000° F. for an extended period such as approximately five (5) hours.

The smelted mixture may thereafter be fritted in deionized water and ground into particles in a suitable pulverizer which is non-contaminated. The particles may then be mixed with a suitab;e binder and may be pressed into beads which are then sintered at a suitable temperature such as approximately 1400° F. A suitable binder may be polyethylene glycol (marketed under the name "carbowax") or an animal fat. The beads may subsequently be disposed in the space between the rod 24 and the ferrule 27.

To produce the hermetic seal between the rod 24, the ferrule 27 and the insulating material 26, the assembly may be heated for a limited period of time at a suitable elevated temperature. For example, the assembly may be may be heated at a temperature of approximately 1900° F. for a limited period such as approximately twenty (20) to forty (40) minutes. This causes the insulating material 26 to become fused to the rod 24 and the ferrule 27.

Preferably, the heating of the assembly at the elevated temperature for the limited period of time is provided in an oxygen-rich furnace. By providing for the heating of the assembly in an oxygen-rich atmosphere, the formation of oxygen bonds between the insulating material 26 and the rod 24 and between the insulating material 26 and the ferrule 27 is facilitated. Conversely, the formation of carbides with the iron in the "INCONEL" alloy is inhibited.

The assembly is subsequently cooled rapidly as by quenching the assembly at ambient room temperature. This quenching creates a strong compression of the insulating material around the periphery of the insulating material. However, the core of the insulating material 26 has a reduced compression relative to that at the periphery of the insulating material. The formation of a hermetic seal with the insulating material 26 under compression at the boundaries with the rod 24 and the ferrule 27 insures that the hermetic seal will be maintained even when the assembly encounters wide variations in conditions.

In the insulating material 26, the oxides of lead, silicon, bismuth and sodium constitute glass formers. The oxides of cerium, lanthanum, zinc and zirconium produce crystallites. These crystallites have different sizes and shapes to enhance the ability of the insulating material to withstand different operating conditions. The amount of crystallites in the material may be in the order of eighty five percent (85%) to ninety percent (90%) and the remainder of the material may be amorphous. The amorphous portion may be dispersed somewhat uniformly throughout the insulating material.

The oxides of zinc and aluminum tend to increase the viscosity of the insulating material 26. The oxide of aluminum also increases the melting temperature of the insulating material. In addition to producing crystallites, the oxide of cerium prevents the oxide of lanthanum from crystallizing too quickly or from crystallizing irregularly. As a result, the oxide of cerium is instrumental in providing homogeneity in the insulating material. The oxide of cobalt and the oxide of molybdenum enhance the bond of the insulating material to certain elements such as nickel, vanadium and chromium when the rod 24 and the ferrule 27 are made from a suitable material such as an "INCONEL" alloy. The oxide of bismuth tends to promote high surface resistivity, thereby increasing the electrical resistance of the material. The oxide of bismuth also tends to prevent lead from leaching out of the material.

Layers of insulating material 30 and 32 may be fused to the insulating material 26 at opposite ends of the insulating material 26. The layers 30 and 32 may be provided with properties compatible with the properties of the insulating material 26. Preferably, the layers 30 and 32 have properties which correspond substantially to the properties of the layer 26. Even more preferably, the layers 30 and 32 have compositions corresponding substantially to the composition of the layer 26. The insulating layers 30 and 32 are not hermetically sealed to the rod 24 and the ferrule 27.

The insulating materials 30 and 32 provide certain advantages. The materials are substantially completely polycrystalline. This causes the materials to be formed with substantially flat surfaces at the ends displaced from the material 26. Because of these flat surfaces, other components can be disposed in a flush relationship with the outer surfaces of the layers 30 and 32 to facilitate assembly of different components in a compact relationship. The insulating layers 30 and 32 also provide a mechanical, electrical and chemical barrier. This causes the insulating materials 26, 30 and 32 to withstand electrical and mechanical forces imposed against the materials and to withstand the effects of deleterious chemicals passing to the materials.

The preferred composition of the insulating materials 30 and 32 is set forth in the following table:

| Material | Relative Amount by Weight |
| --- | --- |
| Oxide of lead (red lead) | 480 |
| Oxide of zinc | 10 |
| Oxide of aluminum (preferably calcined) | 24 |
| Silicon dioxide | 300 |
| Oxide of cerium | 10 |
| Oxide of lanthanum | 30 |
| Oxide of cobalt | 20 |
| Sodium antimonate | 140 |
| Zinc zirconium silicate | 31 |
| Bismuth trioxide | 40 |
| Molybdenum trioxide | 22 (but as low as 0.5% by weight) |

Various substitutions may be made in the different oxides as specified above for the insulating material 26.

As will be seen, the preferred embodiment of the insulating materials 30 and 32 corresponds substantially to the preferred embodiment of the insulating material 26 with certain specific differences. One primary difference is that the relative amount of sodium antimonate in the insulating materials 30 and 32 is significantly greater than the amount of sodium antimonate in the insulating material 26. However, the relative amount of bismuth trioxide in the insulating materials 30 and 32 is significantly less than the amount of that material in the insulating material 26. A further significant difference is that the amount of zinc oxide in the insulating materials 30 and 32 is considerably less than the amount of zinc oxide in the insulating material 26.

Furthermore, even though the amounts of cobalt oxide and molybdenum trioxide in the insulating material 26 and in the insulating materials 30 and 32 are relatively low, there is a somewhat significant difference in percentage between the relative amounts of these oxides in the insulating material 26 and in the insulating materials 30 and 32. However, since the cobalt oxide and the molybdenum trioxide enhance the bond to nickel, the net effect of the oxide of cobalt and the trioxide of molybdenum in the insulating material 26 and the insulating materials 30 and 32 may be approximately the same. This results from the fact that the amount of cobalt oxide in the insulating material 26 is less than that in the materials 30 and 32 but the amount of molybdenum trioxide in the material 26 is greater than in the materials 30 and 32.

The mixture forming the insulating materials 30 and 32 is smelted at a temperature of approximately 2000° F. for an extended period such as a period of approximately four (4) to six (6) hours. The material is then formed into a bead in the manner described above. These beads are added as layers to the beads forming the insulating material 26 and the assembly is then fused at a particular temperature such as 1900° F. for a limited period of time such as approximately twenty (20) to forty (40) minutes.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination,
a first member,
a second member disposed in spaced relationship to the first member,
a first insulating material disposed between the first and second members in hermetically sealed relationship to these members and having a partially crystalline and partially amorphous composition, and
a second insulating material disposed between the first and second members in fused relationship to the first insulating material and having a more crystalline composition than the first insulating material and providing a mechanical and chemical barrier, the chemicals constituting the first insulating material being the same as the chemicals constituting the second insulating material,
the first and second insulating materials being non-hygroscopic.

2. The combination set forth in claim 1 wherein
the first and second insulating materials have characteristics of preventing the passage of gases and have electrical resistances in the order of thousands of megohms when subjected to hundreds of direct volts or alternating volts.

3. The combination set forth in claim 1 wherein
the first and second members are made from an alloy of nickel, chromium and iron.

4. The combination set forth in claim 1, including,
the second member being capable of being subjected to pressures in the order of tens of thousands of pounds per square inch on one surface and to relatively little pressure on a second surface displaced from the first surface and the first and second insulating materials being capable of withstanding this difference in pressure.

5. The combination set forth in claim 1, wherein
the second insulating material is substantially completely polycrystalline and has a substantially flat surface at the end opposite the first insulating material.

6. The combination set forth in claim 5, wherein
the first and second insulating materials include the oxide of bismuth and the first insulating material has considerably more bismuth oxide than the second insulating material.

7. The combination set forth in claim 6 wherein
the first and second insulating materials include sodium antimonate and the second insulating material has more sodium antimonate than the first insulating material.

8. The combination set forth in claim 7 wherein
the first and second insulating materials include the oxides of lead, zinc, aluminum, silicon, cerium, lanthanum, cobalt, sodium, zirconium and molybdenum.

9. The combination set forth in claim 1, including,
a third insulating material disposed between the first and second members on the opposite side of the first insulating material from the second insulating material and fused to the first insulating material and having a more crystalline composition than the first insulating material and providing a mechanical and chemical barrier and formed from essentially the same chemicals as the first insulating material.

10. The combination set forth in claim 9 wherein the first, second and third insulating materials include the oxides of lead, silicon and bismuth and also include sodium antimonate.

11. In combination,
a first member,
a second member disposed in spaced relationship to the first member and having a first surface for receiving pressures to approximately twenty-six thousand pounds per square inch and having a second surface for receiving minimal pounds per square inch,
the second member being constructed to withstand the pressures to approximately twenty-six thousand pounds per square inch between its first and second surfaces,
a ceramic insulating material disposed between the first and second members in hermetically sealed relationship to the first and second members and having partially amorphous and partially polycrystalline properties, the ceramic insulating material withstanding pressures to approximately twenty-six thousand pounds per square inch while retaining the hermetic seal with the first and second members,
the ceramic insulating material having electrical resistances in the order of ten thousand megohms even after being subjected to live steam for extended periods of time,
the ceramic insulating material being non-hygroscopic and providing an electrical insulation of approximately ten thousand megohms even after being subjected to an exposure of live steam for approximately three (3) days at a temperature of approximately 212° F. in a confined space and being blow dried for approximately thirty (30) seconds with dry nitrogen,
the ceramic insulating material including the oxides of zinc, cerium and lanthanum and sodium antimonate.

12. In combination,
a first member,
a second member disposed in spaced relationship to the first member and having a first surface for receiving pressures to approximately twenty-six thousand pounds per square inch and having a second surface for receiving minimal pounds per square inch,
the second member being constructed to withstand the pressures to approximately twenty-six thousand pounds per square inch between its first and second surfaces,
a ceramic insulating material disposed between the first and second members in hermetically sealed relationship to the first and second members and having partially amorphous and partially polycrystalline properties, the ceramic insulating material withstanding pressures to approximately twenty-six thousand pounds per square inch while retaining the hermetic seal with the first and second members,
the ceramic insulating material having electrical resistances in the order of ten thousand megohms even after being subjected to live steam for extended periods of time,
the ceramic insulating material including the oxides of lead, zinc, aluminum, silicon, cerium, lanthanum, cobalt, sodium, zirconium and bismuth and also including sodium antimonate.

13. In combination,
a first member,
a second member disposed in spaced relationship to the first member and having a first surface for receiving pressures to approximately twenty-six thousand pounds per square inch and having a second surface for receiving minimal pounds per square inch,
the second member being constructed to withstand the pressures to approximately twenty-six thousand pounds per square inch between its first and second surfaces,
a ceramic insulating material disposed between the first and second members in hermetically sealed relationship to the first and second members and having partially amorphous and partially polycrystalline properties, the ceramic insulating material withstanding pressures to approximately twenty-six thousand pounds per square inch while retaining the hermetic seal with the first and second members,
the ceramic insulating material having the following composition:

| Material | Relative Amount By Weight |
| --- | --- |
| Lead oxide | 455 |
| Zinc oxide | 40 |
| Alumina | 20 |
| Silicon dioxide | 300 |
| Cerium oxide | 10 |
| Lanthanum oxide | 30 |
| Cobalt oxide | 15 |
| Sodium antimonate | 80 |
| Zinc zirconium silicate | 30 |
| Bismuth trioxide | 100 |
| Molybdenum trioxide | 30 |

14. The combination set forth in claim 13, including,
a second ceramic insulating material disposed between the first and second members in fused relationship to the first ceramic insulating material and formed from the same chemicals as the first ceramic insulating material member and provided with more crystalline properties than the first ceramic insulating material and providing a mechanical and chemical barrier,
the second ceramic insulating material having the following composition:

| Chemical | Relative Amount By Weight |
| --- | --- |
| Lead oxide | 480 |
| Zinc oxide | 10 |
| Alumina | 24 |
| Silicon dioxide | 300 |
| Cerium oxide | 10 |
| Lanthanum oxide | 30 |
| Cobalt oxide | 20 |
| Sodium antimonate | 140 |
| Zinc zirconium silicate | 31 |
| Bismuth trioxide | 40 |
| Molybdenum trioxide | 22 |

* * * * *